(12) United States Patent
Tucker

(10) Patent No.: US 8,470,143 B2
(45) Date of Patent: Jun. 25, 2013

(54) ADVANCED CHLORINE GENERATING SYSTEM

(76) Inventor: Daniel Moroni Tucker, Walnut Creek, CA (US)

( * ) Notice: Subject to any disclaimer, the term of this patent is extended or adjusted under 35 U.S.C. 154(b) by 530 days.

(21) Appl. No.: 12/694,039

(22) Filed: Jan. 26, 2010

(65) Prior Publication Data

US 2011/0180395 A1    Jul. 28, 2011

(51) Int. Cl.
C25B 1/26    (2006.01)

(52) U.S. Cl.
USPC ........ 204/252; 204/263; 204/266; 204/275.1; 204/278

(58) Field of Classification Search
USPC ......................................................... 204/252
See application file for complete search history.

(56) References Cited

U.S. PATENT DOCUMENTS

| | | | | |
|---|---|---|---|---|
| 3,751,233 | A | * | 8/1973 | Tischler ........................ 422/119 |
| 4,439,295 | A | * | 3/1984 | Richards ........................ 210/97 |
| 4,484,991 | A | | 11/1984 | Angelo et al. |
| 4,599,159 | A | * | 7/1986 | Hilbig ........................... 204/266 |
| 4,693,806 | A | | 9/1987 | Tucker |
| 4,781,810 | A | * | 11/1988 | Tucker ........................ 204/228.2 |
| 5,688,385 | A | | 11/1997 | Rhees et al. |
| 6,562,243 | B2 | * | 5/2003 | Sherman ........................ 210/754 |
| 2002/0189954 | A1 | * | 12/2002 | Miyazaki et al. .............. 205/742 |
| 2003/0049137 | A1 | * | 3/2003 | Broerman et al. .......... 417/182.5 |
| 2004/0140200 | A1 | | 7/2004 | Lemke |
| 2008/0264447 | A1 | * | 10/2008 | Eyal ................................ 134/18 |

OTHER PUBLICATIONS

Internet Archive Report for www.chlorinegenie.com accessed on May 4, 2012 from www.archive.org.*
Website printout of www.chlorinegenie.com from Jan. 28, 2011.*
The Chlorine Genie Sales Brochure obtained from www.chlorinegenie.com from Jan. 28, 2011.*

* cited by examiner

*Primary Examiner* — Jonathan Johnson
*Assistant Examiner* — Bryan D. Ripa
(74) *Attorney, Agent, or Firm* — Russ Weinzimmer & Associates P.C.

(57) ABSTRACT

A chlorine-generating apparatus is herein disclosed which uses softened household water and salt. The apparatus includes a freestanding brine tank to hold salt and softened household water. The brine tank includes a submerged chlorine-generating cell, an improved chlorine-generating cell container, and a cell-cleaning reservoir. The brine tank also includes a precipitation tank to help remove minerals from the incoming household water. The chlorine-generating apparatus generates sodium hypochlorite, sodium hydroxide, as well as other sanitizing chemicals. The chlorine-generating apparatus also incorporates an improved method for controlling pH. A water-cooled power supply independently delivers power to the chlorine-generating cell.

23 Claims, 11 Drawing Sheets

ADVANCED CHLORINE GENERATING SYSTEM

FIELD OF THE INVENTION

The present invention generally relates to on-site chlorine generation from brine water, and particularly to on-site chlorine generating and infusion systems for swimming pools and other bodies of water needing sanitation.

BACKGROUND OF THE INVENTION

Known methods of on-site chlorine generation have proven relatively suitable, although there have been problems relating to chlorine generating units for residential swimming pools and small to medium bodies of water (under 40,000 gallons). For the most part, known methods of on-site chlorine generation have not been adequate for treating large commercial swimming pools or large bodies of water.

Swimming pools, as well as certain other bodies of water, must be sanitized in order to be safe for use. Lack of proper sanitization results in damaged equipment, damaged pool surfaces, and allows water to become a breeding ground for disease and algae.

Swimming pool owners generally take care of the chemistry of the pool water in one of the following ways:

The residential pool owner hires a pool service company to come out once a week and bring the chemicals necessary to keep the water safe and sanitized.

The Board of Health will not allow a "once a week" treatment for commercial pools. The Board of Health requires that any commercial or public pool have some means on-site for automatically dispensing sanitizing chemicals into the pool water.

Common on-site chemical dispensing devices are: an adjustable liquid pump that takes liquid chlorine from a storage vat, and injects it into the pool's return line; a chlorine tablet holder that is installed into the return line that allows the tablets to be dissolved at an adjustable rate; and a powdered chlorine dispenser that automatically dumps powder into a container that has pool water circulating through it.

Some problems with these devices are that, because they are mechanical and exposed to the corrosive nature of pool chemicals, they are not very reliable, and require frequent service or replacement. Often the owner/operator resorts to adding chlorine into the pool by hand.

Another method for dispensing chlorine that has become accepted in recent years is to add salt to the pool and then to install an in-line chlorine-generating cell that will produce chlorine from the salt in the pool water.

Two of the Many Problems with this Type of Device are:

1. The amount of chlorine produced is too small to adequately deliver the amount of chlorine needed during a heavy swim load. As a result, it is a common practice to have a liquid chlorine dispenser as a backup; and 2. Since pool water commonly has a high amount of dissolved solids, the inline cells become fouled with hard water deposits, and consequently require frequent cleaning, service, and/or replacing.

Bromine dispensers are another method for dispensing sanitizing chemicals into a pool to be sanitized. Bromine is an accepted product for sanitizing pool water and can be provided as a tablet, or in stick form. Dispensed into the pool water, bromine will kill algae and bacteria, but is far more expensive than chlorine.

Another method, which has been outlawed in some areas because of extreme hazards associated therewith, is to have a pool service bring compressed chlorine gas to a pool site, and then to dispense it into the pool water. This is accomplished by submerging a manifold in the deep end of the pool, and then bubbling chlorine gas into the water from a portable gas cylinder. In addition to the danger of having compressed chlorine gas in a neighborhood, the addition of chlorine gas to pool water makes an acid that must be neutralized with a base product, such as soda ash. With this method, the extreme vacillation of pH and chlorine, from high to low, adversely affects the swimmer's health and safety, as well as causing bleaching of suntan, swimwear, and towels, and leads to green hair, irritated skin, and irritated eyes.

In addition, when the pH is below 7, and there is any copper in the pool's plumbing, copper oxide is formed, which causes a blue-green stain on the pool finish. When the pH of the pool rises above 8, minerals in the pool water deposit on the pool finish. These variations in pool water chemistry shorten the life of the pool's plumbing, equipment, and plaster finish.

In addition to the above problems, when concentrated commercial chemicals are used, it is easy to over-treat the pool water, and to get the chemistry out of balance. Out-of-balance pool water is the culprit that causes most surface-staining of plasters, and causes discomfort to swimmers.

Over the years, there have been a number of other devices and methods that have been marketed to assist in the sanitation of pool water.

For example, ultraviolet light is a sanitizing method which uses a clear plastic or glass cell containing an ultraviolet (UV) light. When the filtered pool water passes through the cell on its way back to the pool, the water is exposed to UV rays that can kill bacteria. The problem with this system is that it leaves no residual protection in the water. Consequently, if the water becomes contaminated after it leaves the ultraviolet light cell, bacteria in the water will not be killed until the water again passes through the cell. Chlorine is usually still used to provide the residual bacteria kill needed. The basic claim of the ultraviolet light system is that it will reduce the amount of chlorine needed to sanitize a pool.

Ozonators are another device for sanitizing pool water. This type of device uses high voltage to create ozone from the air, which is then injected into the pool water before returning it via the return line of the pool. Ozone kills bacteria, but does not stay in the water after the water is returned to the pool. It will reduce the amount of chlorine needed, but is not accepted by the Board of Health as a sole means of sanitizing pool water, because it doesn't leave a residual disinfectant or sanitizing agent in the pool water for a long enough time.

Copper/Sliver ionization is another method of sanitization. Copper and silver ions cannot remove organic matter, such as skin tissue, hair, urine, and skin flakes from water. Thus, another disinfectant, such as chlorine, needs to be used in addition to the copper and silver ions. Chlorine demand can be reduced by as much as 80% with the addition of copper and silver ions. In addition, copper and silver ions will stay in the water longer than most other sanitizing products, and are not affected by pH, heat, or sun. However, the process of killing bacteria and algae using copper and silver ions is slower than with other pool water sanitization methods. Copper/silver ions and chlorine make a good combination of sterilizing agents, but copper/silver ions are not sufficient as a sole agent for sterilizing pool water.

Commercial Chlorine Products:

Powder and Tablet Forms of Chlorine:

These forms of chlorine usually contain cyanuric acid, commonly called pool stabilizer. After the chlorine delivered by these products has dissipated from the pool water, the stabilizer remains. The effect of stabilizer is to slow down the reaction of chlorine so as to make the chlorine last longer in the pool. Too much stabilizer can inhibit the chlorine's ability to kill bacteria fast enough for the pool water to be safe for swimmers. Therefore, the Board of Health states that stabilizer concentrations over 75 ppm are unsafe, because such concentrations make the reaction of chlorine too slow to kill bacteria. This law prevents commercial pool owners from using pill, powder, and tablet forms of chlorine as the sole method for sanitation.

Another problem using commercial chlorine in the form of tablets and powders is that as much as 95% of the "chlorine" that is purchased is not chlorine, but instead consists of inert ingredients that the manufacturers add to their product to stabilize the chlorine and to give it shelf life. This can add a large amount of undesirable dissolved solids into the pool water, which can eventually cause staining of the pool finish, discomfort for swimmers, and can shorten the life of the filtering equipment.

The chemicals used in treating pool water are manufactured off-site, usually in a rural area away from the heavily populated cities. Products such as salt, stabilizer, calcium, soda ash, etc., must be transported to the chemical factory. After the pool chemicals are manufactured, they must be put in bottles or other suitable containers, labeled as "hazardous products", and then shipped into cities and towns to be stored in warehouses. The products are then shipped in smaller amounts to the retail stores where they are purchased by the service companies or by the end user, and then are transported to the pool site where they are stored until they are used. A vehicle accident while transporting concentrated pool chemicals, or the improper storage of these chemicals, has resulted in the chemicals getting wet or mixed, which has caused fires, explosions, and the emitting of dangerous deadly gases often endangering children as well as adults.

Inline Chlorine Generators:

Over the years, there have been many attempts to generate chlorine at the pool site. Most of these devices require salt to be added to the pool water. Then, when the pool filter system is running, the salted pool water is directed through either an inline chlorine-generating cell, or a by-pass chlorine-generating cell.

To manufacture chlorine from pool water, hundreds of pounds of salt must be poured into the pool. Doing so raises the total dissolved solids, which can lead to deposits being precipitated out of the water onto the tile and pool finish.

When a saltwater pool is drained, or when water from the pool is backwashed into the sewer system, it makes the discharge water too: salty. This causes problems at the treatment plant, and it is now illegal to discharge water from salt-water pools into the sewer system, or to discharge into the drain gutters in some counties.

When an electric potential (also called "electrolysis") is present in the pool water, the increased conductivity due to the salt in the pool water can lead to excessive corrosion on all metal parts of the pool circulating system. Most pool water has a higher amount of dissolved minerals than does tap water. This is due to the inert ingredients left over from pool chemicals that have been put into the pool, and to the evaporation of tap water which also leaves minerals in the pool water, resulting in "hard water". When this hard water flows through chlorine-generating cells, the calcium and magnesium dissolved therein form deposits inside the cell on the cathode (the negative electrode). This reduces the efficiency of the cell, and necessitates cleaning of the cell by the operator, which is difficult and time consuming. If the cell is not cleaned, the build-up will continue to lower the efficiency of the cell, shorten its life, and eventually destroy it.

Another problem with this type of system is that, to make chlorine, the entire filtering system must be running to provide large amounts of constant water flow through the cell. This wastes a great deal of electricity, and does not give the operator the option of filtering less and chlorinating more.

Another problem with in-line chlorine generators is that when pool water temperature drops below 60°, the chlorine production is drastically reduced or terminated with an inline system.

Another problem with in-line chlorine generators is that the efficiency of an electronic cell operating in a mild salt solution is far less than the same electrolytic cell operating in saturated softened brine water.

Another problem with in-line chlorine generators is that when the pool owner changes the valves on his filtering system to use and heat his spa and forgets to shut "off" the inline chlorinator, all the chemicals being manufactured for the pool are directed to the spa, which only contains 500 to 800 gallons of water. In short order, the spa can become dangerously over-chlorinated and out of balance.

Still another problem with in-line chlorine generators is that in the event the filter pump stops, or for any reason the flow of water stops going across the inline chlorine generator's electrodes and the unit is still running, an accumulation of hydrogen gas is created. This pocket of hydrogen gas is extremely dangerous, and can be ignited by sunlight or by the electrodes themselves, resulting in a powerful explosion.

Considering the need for daily chlorination and the increasing cost of energy, as well as the problems caused by adding large amounts of salt to the pool water, these inline chlorine generators are neither able to provide the maximum protection, nor are they cost effective.

DESCRIPTION OF RELATED ART

U.S. Pat. No. 4,500,404, issued Feb. 19, 1985 to Daniel Tucker, also the inventor of the present invention, is a patent for an early predecessor of the present invention. In this first patent, a chlorine-generating device was claimed for a tank containing sodium chloride and a submerged electrolytic cell. The electrolytic cell contained an ion-selective membrane separating anode and cathode compartments. The anode compartment contains the brine solution. The device contains a water softening device to provide soft water to both compartments, a source of direct electrical current with the positive output directed to the anode electrode and compartment, and the negative current connected to the cathode electrode and compartment.

U.S. Pat. No. 4,693,806, issued Sep. 15, 1987 to Daniel Tucker, also the present inventor, is a patent for a successor to the device in U.S. Pat. No. 4,500,404, wherein the tank containing sodium chloride and a submerged electrolytic cell is submerged in a larger tank filled with water such that the cathode compartment of the electrolytic cell communicates directly with the water in the larger tank. The ion-selective membrane passes only hydrogen and sodium ions from the anode compartment to the cathode compartment, thus converting the water in the larger tank to a sodium hydroxide solution. The sodium hydroxide solution causes the hardness minerals contained in the incoming water to be precipitated out. In addition, an isolation valve is disclosed to control the flow of sodium hypochlorite into the main pool system using the main filter pump.

U.S. Pat. No. 4,781,810, issued Nov. 1, 1988 to Daniel Tucker, also the present inventor, is a patent for a successor to the device in U.S. Pat. No. 4,693,806, wherein the chlorine generating cell incorporates a chemical pump for forcibly urging the resulting product to the pool without the use of mechanical pumps or membranes. New methods of reducing maintenance and increasing reliability are also disclosed.

When the above described invention was manufactured and put into the field, a number of problems developed that required field service and re-designing to make the unit more reliable.

PROBLEMS WITH PRIOR ART

The pipe containing the power leads to the submerged electrodes would fill, over time, with condensation, causing the electrical connections to corrode and fail.

The customer would forget to recharge the water softener, and then hard water would enter the brine tank and cell, thereby causing the cell to fail.

The customer would not acid-clean the electronic cell and, in hard water areas, the mineral deposited on the submerged cell would cause it to fail.

The cell was not able to produce enough chlorine to offset the heavy swim load and temperature of commercial swimming pools.

The pH of the pool water would rise on the alkalinity side, and the device for pH control in the above patent was too complicated and didn't work adequately.

The customers would put too much salt in the unit and cause the unit to fail.

The unit was difficult and time-consuming to install because the power supply was separated from the brine tank.

The power supply was inefficient and wasteful of electricity.

The pumping action of the submerged cell was compromised by the impurities in the brine water and the complicated plumbing.

The concentration of the chlorinated liquid returned to the bottom of the brine tank caused failure of the brine tank itself, and caused excessive corrosion of metal parts.

Chlorine fumes were common around the top of the brine tank.

The prior art could not produce enough sanitizing agents to sanitize large commercial pools without installing multiple units.

SUMMARY OF THE INVENTION

The invention solves the problems of the prior art so as to improve reliability, reduce cost, reduce service problems, and increase productivity.

The invention installs easily and can be operated by a normal unskilled pool operator. It provides far less undesirable inert products to the body of water being treated. The invention saves electricity by requiring less filter time, and eliminates wasted energy used in the manufacturing, transporting, packaging, storing and delivering hazardous commercial chemicals.

The invention provides, at a low cost and high reliability, a combination of sanitizing chemicals by using a small amount of softened household water being delivered to a self standing brine tank which contains salt and a submerged electronic cell.

The invention provides internal protection for the cell so that it can operate efficiently and not become fouled with un-dissolved salt or mineral deposits.

The invention provides automatic treatment for incoming water so that the submerged cell is exposed to a minimum amount of hardness minerals thus minimizing hardness build-up on the electrodes.

The invention provides a convenient, easy method for cleaning the cell either automatically or manually by activating an electronic circuit.

The invention provides encapsulated electrical leads within a PVC pipe that goes to the submerged cell so as to avoid condensation in the PVC pipe which can lead to failure of the electrical connections.

The invention provides an easy, convenient method to force the liquid out of the cell-cleaning reservoir so the cell-cleaning reservoir can be recharged with fresh acid.

The invention provides a unit that has a minimal amount of moving parts and is easy to install.

The invention provides a unit wherein the pH of the liquid leaving the unit can be easily adjusted to assist the pool operator in controlling the pH of the water being treated, The invention provides a unique way of mixing the filtered incoming water from the RO unit with the discharge from the cathode side of the submerged cell in such a way as to efficiently cause minerals to precipitate to the bottom of the precipitation tank.

The invention provides a cell container that delivers mild salt water to the intake of the cathode side of the cell and, at the same time, provide brine water to the intake of the anode side of the cell.

The invention provides a cell container that allows brine water to enter the cell but prevents un-dissolved salt from entering and fouling the cell.

The invention provides a cell container that is sealed at the bottom which directs heavily chlorinated water back through the cell, making the cell more efficient, and, at the same time, reducing the amount of chlorine fume exiting the brine tank.

The invention provides a unit that can efficiently mix or combine chlorine gas, sodium hydroxide and other chemicals into a liquid form and deliver it to the water being treated without using any moving parts.

The invention provides a unit in which the improved pumping action of the cell allows it to deliver the liquid and chemicals generated in each of the electrode compartments to separate areas of the unit for proper mixing which minimizes chlorine fumes.

The invention provides an efficient mixing chamber filled with a media that will combine the chemicals with water and deliver the mixture to the water being treated.

The invention provides a unit designed in such a way that all incoming and exit fittings are installed above the water level in the brine tank which eliminates leaks.

The invention provides a sealed, water cooled, weather protected cabinet that encloses a solid-state power supply and other electronic parts.

The invention provides a water-cooled, thermally protected, voltage regulated power supply that can deliver low voltage power efficiently to a chlorine generating cell and optionally to a copper/silver ionizing cell.

The invention provides a unit that can be more easily shipped, installed, and serviced.

The invention provides a complete unit for sanitizing water using the basic elements of salt, water, and acid, also requiring very little maintenance, using very little power, and having the option of significantly increasing the amount of sanitizing agents by the addition of a copper/silver cell.

The water level in the brine tank is maintained by local utility water, which is notably softer than pool water. The water enters the unit through a pre-sediment filter, which will remove foreign particles. The water then is directed through the unit's solenoid valve. When the power supply turns the unit on, the water leaves the solenoid valve and is directed through an aluminum heat exchanger or heat sink. The water then enters a reverse osmoses unit, which separates the water into two streams.

One stream (about 25% of the water) goes through a reverse osmosis filter, which removes 80% to 90% of the hardness minerals. The other stream (about 75%) by-passes the filter, picks up the mineral laden water from the reverse osmosis unit, and carries it to a sealed mixing chamber where chlorine gas and sodium hydroxide are combined with other chemicals to form a chlorinated liquid that is then delivered to the pool through the chlorine exit port of the unit. The smaller (reduced mineral) stream (25%) is directed into a precipitation tank where it is mixed with the effluent from the cathode side of the submerged cell. Because of the caustic (alkaline, high pH, or basic) nature of that water, most of the remaining hardness contained in the incoming water will precipitate to the bottom of the precipitation tank.

Water, almost mineral free, then overflows onto the surface of the brine tank. When this liquid dissolves the salt at the bottom of the tank and goes through the submerged chlorine-generating cell, the amount of mineral build up on the cathode side of the chlorine-generating cell is greatly reduced. The submerged chlorine-generating cell is enclosed in its own cell container that protects the chlorine-generating cell from being fouled by un-dissolved salt and also keeps chlorinated liquid from migrating throughout the bottom of the brine tank.

To further protect the chlorine-generating cell and keep the chlorine-generating cell clean, a sealed acid-cleaning reservoir, filled with acidic solution, is provided inside the brine tank. A second solenoid valve is provided and is connected to household water. When that valve is activated, either manually or electronically, water is injected into the top of the reservoir thereby forcing a small amount of acid out of the bottom. A portion of the acid is directed to the cathode side of the cell, and a portion is directed to the mixer, thereby cleaning the unit and its plumbing of hardness build-up, and keeping it working at peak efficiency, as well as extending its service life. Since the acid used for cleaning eventually ends up being delivered to the pool, this process also aids in controlling the pH of the pool water.

Mounted on top of the brine tank is a sealed aluminum cabinet containing a solid-state power supply. A digital timer is mounted on the front of the aluminum cabinet.

A general aspect of the invention is a chlorine-generating and infusion apparatus. The apparatus includes: an inlet port capable of receiving household water; a precipitation tank capable of removing minerals from the household water so as to provide softened water; and a brine tank capable of containing a solution of salt in the softened water. The brine tank includes: a chlorine-generating cell submerged in the softened water, the chlorine-generating cell providing at least sodium hypochlorite and sodium hydroxide; and a water-cooled power supply for providing power to the chlorine-generating cell. The apparatus also includes: a cell container having a PVC pipe with a sealed cap at the bottom of the pipe and at least one hole along a side of the pipe, the hole preventing un-dissolved salt from entering the cell container; and a cell-cleaning reservoir connected to the chlorine-generating cell.

In a preferred embodiment, the chlorine-generating cell also generates hypochlorous acid, oxygen, and sodium hydroxide.

In another preferred embodiment, the apparatus further includes apparatus for controlling pH, connected to the brine tank.

In another preferred embodiment, the brine tank is free-standing.

In still another preferred embodiment, the power supply and the brine tank are integrated as one unit.

In yet another preferred embodiment, the brine tank includes: an outer shell for storing salt and water; and an un-dissolved salt indicator capable of indicating a level of un-dissolved salt.

In preferred embodiments, the chlorine-generating cell includes: an anode electrode chamber containing softened water; and a cathode electrode chamber containing softened household water, the anode electrode chamber being separated from the cathode electrode chamber by an ion selective membrane, the ion selective membrane keeping chlorine and oxygen gases produced in the anode electrode chamber separate from sodium and hydrogen gas produced in the cathode electrode chamber. In a further preferred embodiment, gases in each electrode chamber pump liquid from each electrode chamber in a percolating fashion, thereby urging liquid and gas products produced in each chamber to be delivered to a desired location.

In another preferred embodiment, the chlorine-generating cell includes electrical leads that are connected to electrodes in the anode and cathode chambers, the electrical leads being enclosed in PVC pipes that are injected with a sealing agent that seals the pipes so as to prevent condensation in the pipe, thereby preventing corrosion of electrical connections of the electrical leads.

In still another preferred embodiment, the brine tank includes: a sealed de-watering device attached directly to the intake of the anode electrode chamber, the sealed de-watering device being capable of separating chlorine gas from the brine water after the brine water has been pumped from the anode electrode chamber, the sealed de-watering device also being capable of directing the chlorine gas to a mixing chamber, while the unused brine water is returned to the intake of the anode electrode chamber, thereby minimizing the amount of chlorine fumes escaping the brine tank, while also increasing the efficiency of chlorine production by returning discharge from the sealed de-watering device to the intake of the anode side of the chlorine-generating cell.

In yet another preferred embodiment, the apparatus further includes: a reverse osmosis system, connected to the brine tank, the reverse osmosis system including: a reverse osmosis housing connected to the brine tank, a pre-sediment filter connected to the reverse osmosis housing, a reverse osmosis cartridge disposed within the reverse osmosis housing, and an inline restrictor connected to the reverse osmosis housing, wherein household water enters the pre-sediment filter, and then flows into the reverse osmosis housing where the reverse osmosis cartridge serves to separate the water so that a more mineral-free water enters the precipitation tank, and so that the mineral laden water exits the reverse osmosis cartridge through the inline restrictor and into the mixing chamber.

In another preferred embodiment, the brine tank further includes: a sealed mixing chamber, wherein a by-pass stream exiting the reverse osmosis system enters a restrictor and is then directed to the top of the sealed mixing chamber where the by-pass stream efficiently combines with chlorine gas and forms a chlorinated liquid that is then directed to the water being treated. In a further preferred embodiment, the sealed mixing chamber is mounted inside the brine tank above a highest water level within the brine tank, thereby eliminating leaks.

In another further preferred embodiment, the apparatus includes: a precipitation tank, connected to the inside of the brine tank, wherein a more mineral-free water that has exited the reverse osmosis cartridge is mixed with a high pH liquid that is pumped from the cathode electrode chamber of the chlorine-generating cell, thereby causing additional minerals in the more mineral-free water to precipitate to the bottom of the precipitation tank, resulting in a much softer water that then flows into the brine tank. In a still further preferred embodiment, the precipitation tank includes a pH valve that can be opened so as to allow some high pH water to be directed to waste, thereby lowering the pH of the chlorinated liquid exiting the unit.

In another further preferred embodiment, the cathode electrode compartment of the chlorine-generating cell produces a high pH solution, which is pumped from the cathode electrode chamber to the precipitation tank, and is then mixed with the reduced-mineral water exiting the reverse osmosis cartridge, thereby causing dissolved minerals to precipitate to the bottom of the precipitation tank, thereby substantially reducing the amount of dissolved minerals entering the brine tank.

In a preferred embodiment, the chlorine-generating cell includes: a chlorine-generating cell container that: separates the un-dissolved salt in the bottom of the brine tank from the brine water, while allowing the brine water to enter an intake of the anode electrode chamber of the chlorine generating cell, the intake being located in the bottom portion of the cell container, thereby preventing un-dissolved salt from entering the intake of the anode electrode chamber of the chlorine-generating cell; and allows softened mild salt water at the top of the chlorine-generating cell container to be directed to the intake of the cathode electrode chamber of the chlorine-generating cell. In a further preferred embodiment, the chlorine-generating cell container has a series of small holes in its side wall, and is sealed at the bottom so as to form a pocket that discourages chlorinated brine water returning from the dewatering device from migrating throughout the bottom of the brine tank, thereby improving efficiency of production of chlorine gas delivered to the dewatering device, and thereby minimizing the amount of chlorine fumes escaping from the brine tank.

In a preferred embodiment, the apparatus further includes a cell-cleaning reservoir, connected to the a chlorine-generating cell, the cell cleaning reservoir storing an acidic solution that is sent to: the chlorine-generating cell, the mixing chamber, and plumbing going to a body of water to be treated.

In another preferred embodiment, the apparatus further includes a cell-cleaning reservoir, connected to the chlorine-generating cell, the cell cleaning reservoir having an air injection fitting that can be used to attach a compressed air source that can be used to empty the cell-cleaning reservoir of solution by injecting compressed air.

In a further preferred embodiment, the cell-cleaning reservoir includes: an electrical circuit that can be programmed to periodically activate the release of household water into the cell-cleaning reservoir which in turn forces a portion of the acidic solution from the cell-cleaning reservoir so as to clean: the chlorine-generating cell, the mixing chamber, and the plumbing going to the body of water to be treated. In a further preferred embodiment, the apparatus includes a solid state power supply with thermal protection that incorporates full voltage regulation, such that when the acidic solution is injected into the chlorine-generating cell, the acid will not cause an electrical overload.

In a further preferred embodiment, the apparatus includes: a solid state power supply that can react to information delivered by a controlling unit capable of sensing at least one of the readings of the water being treated, including: pH, chlorine, and copper/silver ions.

In another further preferred embodiment, the apparatus includes: a solid state power supply that has an optional circuit having a 24-hour programmable timer; and a pulsating circuit controlling device adapted to power an ionizing copper/silver cell installed in a circulating system of the body of water being treated.

In a preferred embodiment, the apparatus further includes: a check valve, installed in a chlorine exit line connected to the chlorine-generating cell, the check valve preventing back-up water from back-flowing into the unit when the same line for delivering make up water is used for adding chlorine from the unit.

BRIEF DESCRIPTION OF THE DRAWINGS

The present invention may best be understood by reference to the following description taken in connection with the accompanying figures, wherein.

DETAILED DESCRIPTION

Figure 1:
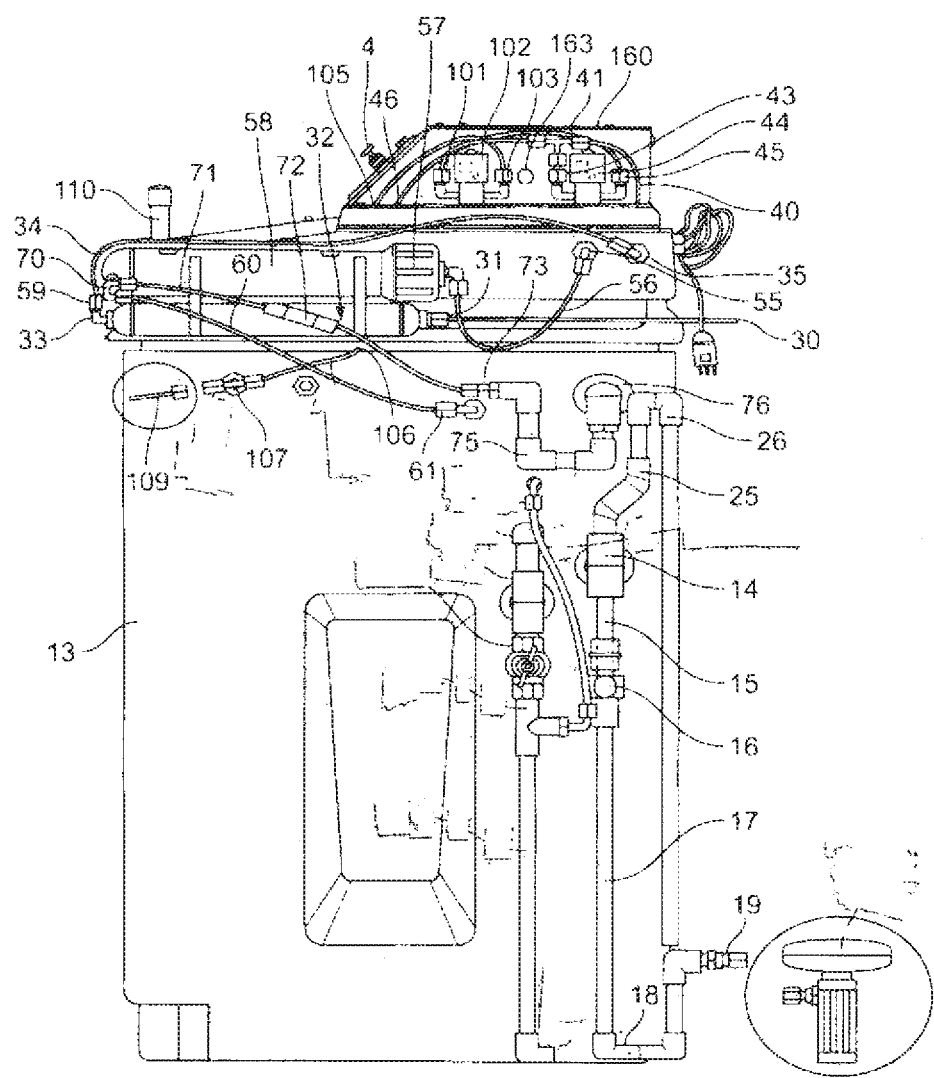
FIG. 1 is view of a right side of the outside of the brine tank and the outside of the power supply cabinet.

FIG. 1 Provides a right side view of the brine tank of the invention. The power supply cabinet 160 is mounted on top of the brine tank 13. The incoming tap water 30 enters the pre-sediment filter 32 through fitting 31. Water exits the pre-sediment filter 32 flows through fitting 33, then the water flows through tube 34 to fitting 35; then it enters brine tank 13 through fitting 35. Water exits top of brine tank 13 through tube 40 and goes to water tee 41. The two sides of the tee direct water as follows:

Water exits one side of the incoming water tee fitting 41 enters water "in" fitting 101 of the cleaning solenoid valve, flows through cleaning solenoid valve 102 and exits through fitting 103. Water then enters the top of the brine tank 13 through cleaning water tube hole 105, goes Out through tube 106 and connects to Teflon tee 107 which connects to "in" PVC fitting 139 (see FIG. 4) and delivers water to acid reservoir 140.

The other side of tee 41 connects to water "in" fitting 43. Water enters the water solenoid valve 44 through fitting 43.

The water exits the water solenoid valve 44 through tubing connected to water exit fitting 45. The tubing then goes through top hole 46 in top of brine tank 13. The water then enters the heat exchanger 47 (see FIG. 9) through water entrance fitting 48. The water exits the heat exchanger 47 through water exit fitting 49 and comes to the outside of the brine tank 13 through water exit fitting 55 and is delivered by reverse osmosis "in" tube 56, to reverse osmosis threaded end cap 57, then to the reverse osmosis unit 58. Water exits the reverse osmosis unit 58 through two fittings as follows:

1. The by-pass water exits the reverse osmosis unit 58 through by-pass exit fitting 70 through black exit tube 71 to inline flow restrictor 72. By-pass water then enters the inline flow restrictor 72, and then flows through Teflon fitting 73. The water then enters water p-trap fitting 75. The water then goes through the brine tank 13, through by-pass "in" fitting 76 and enters the mixer 210 (see FIG. 8) on the inside of the brine tank 13. The bypass water is mixed with chlorine gas in the mixer 210 (see FIG. 7) and then the chlorinated liquid exits the unit through the chlorine exit tee 14. The chlorinated water then enters the PVC chlorine exit pipe 15 and flows down from PVC chlorine exit pipe 15 through a PVC ball check valve 16, and then through another PVC chlorine exit pipe 17 to a PVC p-trap 18. The chlorinated liquid then exits the system through chlorine exit line 19 and flows to the pool.

2. The softened water exits the reverse osmosis unit 58 through 90° water fitting 59 and flows through softened water tube 60, which is connected to 90° fitting 61, which goes through the wall of the brine tank 13. The softened water then continues through softened water tube 60 and discharges into the precipitation tank 128 (FIG. 3) through softened water discharge fitting 62.

The by-pass water is mixed with chlorine gas in the mixer 210; (see FIG. 7) then the chlorinated water exits the unit through the chlorine exit tee 14. (See FIG. 1) The chlorinated water enters PVC chlorine exit pipe 15, flows down from chlorine exit through a PVC chlorine ball check valve 16, through another PVC chlorine exit pipe 17 to PVC p-trap 18. Then the chlorinated liquid exits the system through a chlorine exit line 19 and goes to the pool.

Extending upwards from the chlorine exit tee 14 is a vent pipe 25. At the top of the vent pipe 25, there is a vent pipe 180° bend 26 and the vent pipe continues down ending near the bottom of the outside of the brine tank 13.

Figure 2:
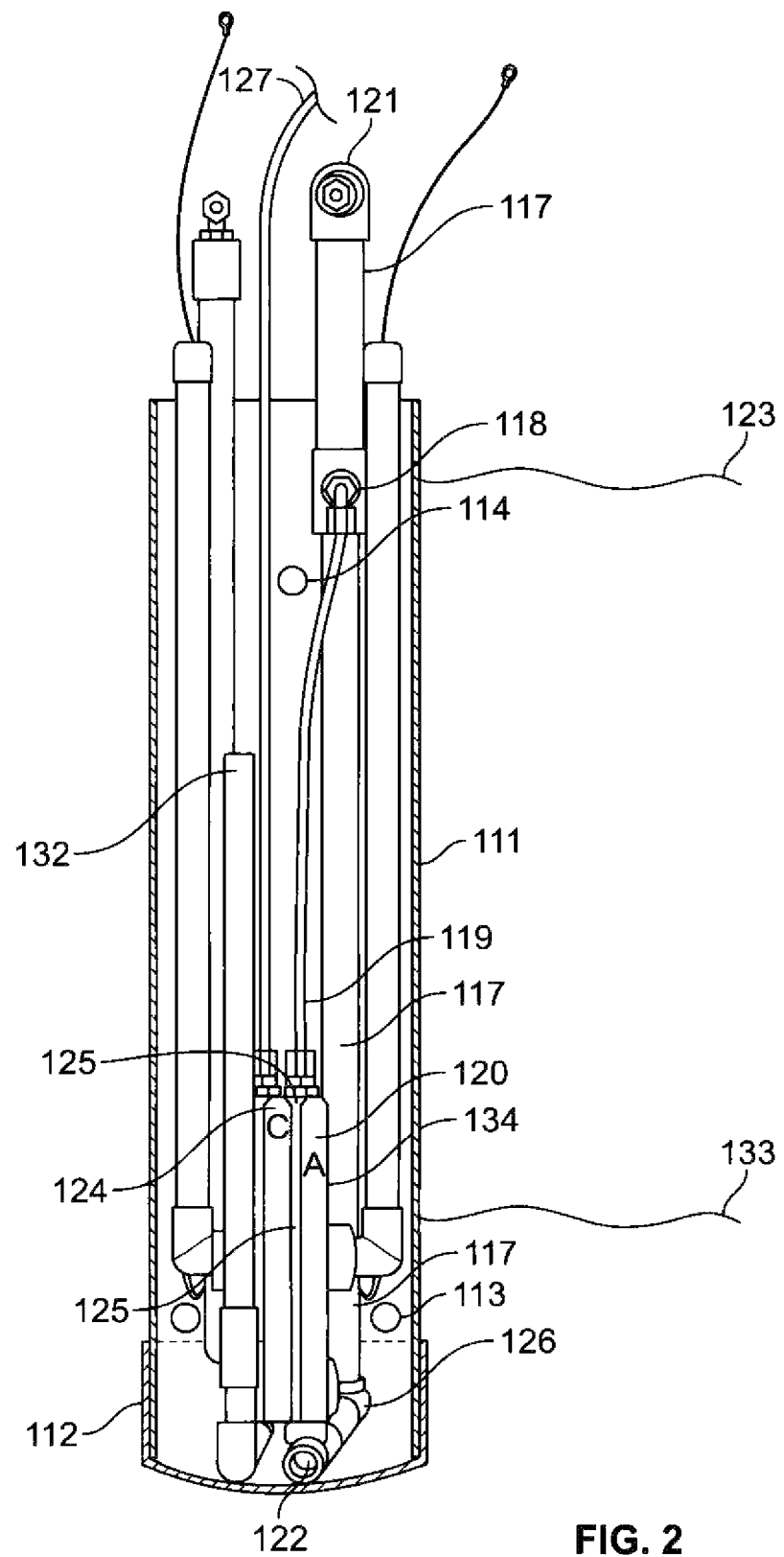
FIG. 2 is a front cut-away view of cell container showing submerged cell.
Figure 3:
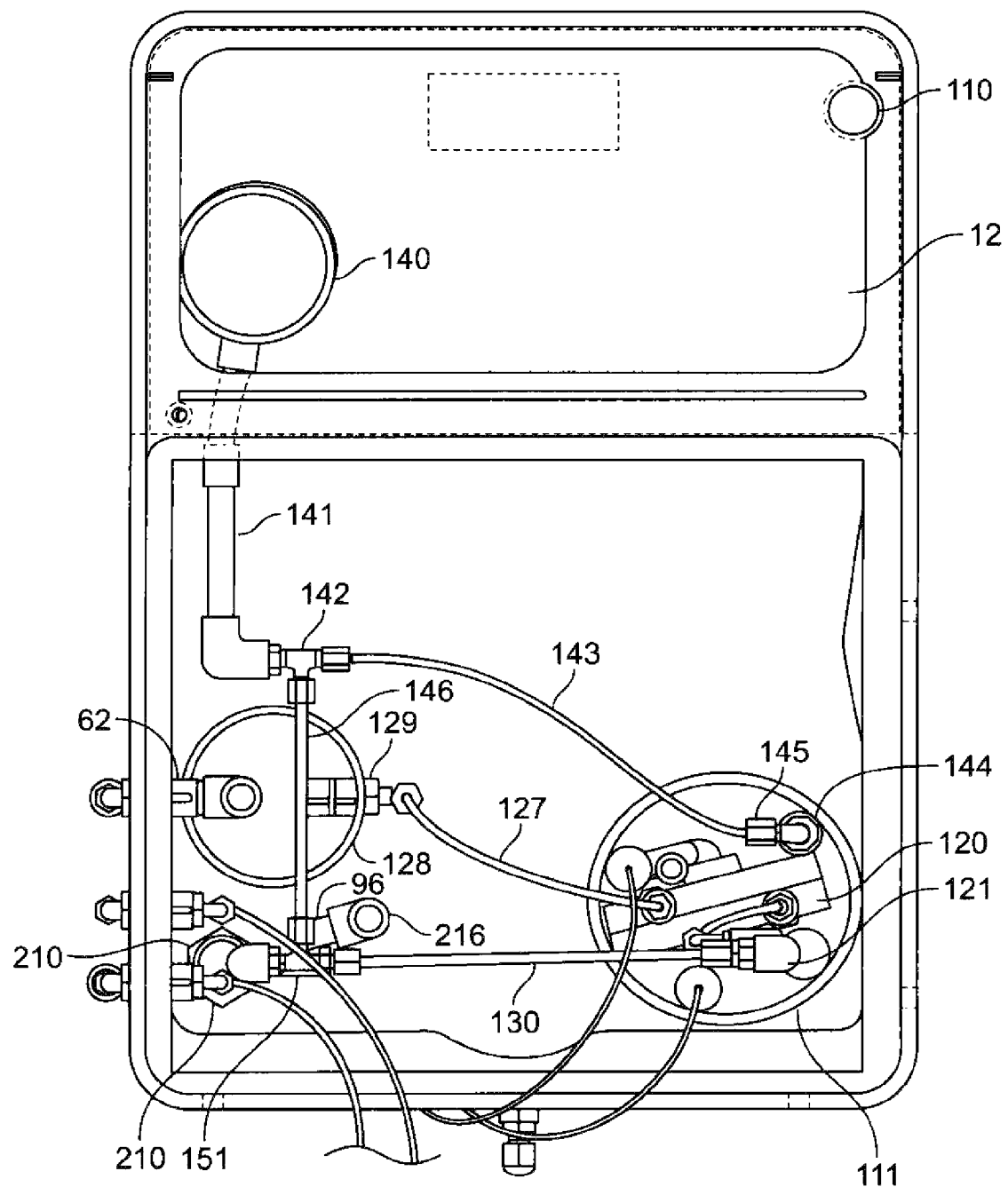
FIG. 3 is a top view of components inside of brine tank.

FIG. 2 Electronic cell in the cell container. The cell container 111 (see FIG. 2) is a 6-inch PVC pipe that prevents un-dissolved salt from entering the anode intake fitting 122. The bottom of the container is sealed with a 6" cap 112 that keeps the chlorinated water (which is returning from the de-watering pipe 117) from spreading throughout the bottom of the brine tank 13. This process minimizes the amount of chlorine that can build up in the bottom of the brine tank 13. A series of holes 113 are drilled into the cell container 111 just above the 6-inch PVC cell container cap 112 to allow only the salt water to enter the cell container 111. The electrolytic cell 120 is submerged in the cell container 111. Hole 114, drilled slightly below the level of the softened fresh water level 123, allows softened fresh water to stay at the top of the cell container 111 while the heavier salt water remains at the bottom. The cathode inlet 132 of the electrolytic cell 120 takes in this fresh, softened water, pumps it through the cathode chamber 124 of the electrolytic cell 120 and discharges it through Teflon tube 127 (FIGS. 2 and 3) into cathode discharge fitting 129 on the top side of the precipitation tank 128 (FIG. 3). Softened brine water enters the electrolytic cell's anode intake fitting 122 and is pumped up through Teflon anode discharge tube 119 into the de-watering device 121 through de-watering fitting 118. The unused softened brine water drops back to the bottom of the electrolytic cell 120, through PVC de-watering pipe 117 and is recycled through the anode chamber 134 of the electrolytic cell 120. The chlorine gas separates from the softened brine water and rises to the top of the de-watering device 121 and then flows to the top of the mixer 210 (see FIGS. 7 & 3) by the Teflon chlorine gas tube 130. Selective membrane 125 (see FIG. 2) keeps the reactions that occur in the cathode chamber 124 separate from the reactions that occur in the anode chamber 134 of the electrolytic cell 120. Because of this separation, the liquid exiting the anode chamber 134 through Teflon anode discharge tube 119 is a mild acid and the liquid exiting the cathode chamber 124 through cathode exit Teflon tube 127 is a mild alkali. The gases created in each chamber rise to the top and enter the exit tubes 127 & 119. The gases then push a portion of the water up and out of both tubes in a percolating pumping action. Thus, without any moving parts, liquid and manufactured chemicals are pumped through both of the electrolytic cell chambers, anode chamber 134 and cathode chamber 124, and are delivered internally to separate destinations. The fresh softened water level is indicated by fresh softened water level 123 and the salt level is indicated by salt level 133.

FIG. 3 The top view of inside of brine tank. Removable salt lid 12 allows salt to be poured into the brine tank 13. The submerged end of the salt indicator rod 110 sits on top of the un-dissolved salt. The height of the rod above the salt lid 12 indicates the amount of un-dissolved salt remaining in the brine tank 13. The cell cleaning reservoir 140 is attached to the side of the brine tank 13 by the same Teflon tee 107 (see FIG. 1) that discharges water into the reservoir through PVC tee 139. The acid is forced out of PVC pipe 141. Most of the acid is directed to the cathode chamber through tube 143 (see FIG. 3) to the electrolytic cell 120 through 90° acid fitting 145. A small part of the acid is directed to Teflon tee 151 and is delivered to the mixer 210. The acid cleans out mineral deposits from the mixer 10 and from the tubing to the pool as well as cleans the electrodes in the electrolytic cell 120. The electrolytic cell 120 sits inside of the cell chamber 111 as described in (FIG. 2). The cathode discharge tube 127 discharges into the precipitation tank 128 through cathode discharge fitting 129. The softened water that has gone through the reverse osmosis unit 58 also discharges into the precipitation tank 128 through fitting 62. When the two streams mix in the precipitation tank 128, because of the high pH of the liquid delivered by the cathode, mineral that was not removed by the reverse osmosis unit 58 will precipitate to the bottom of the precipitation tank 128. Thus, much more mineral free water is delivered to the brine tank 13. The mixer 210 is a sealed container filled with a medium 214. Chlorine gas and water enter the top of the mixer 210. (See FIG. 7) As the water and gas slowly work their way down through the medium, the water absorbs the chlorine gas, and the manufactured chemicals are then delivered to the pool in a liquid form.

Figure 4:
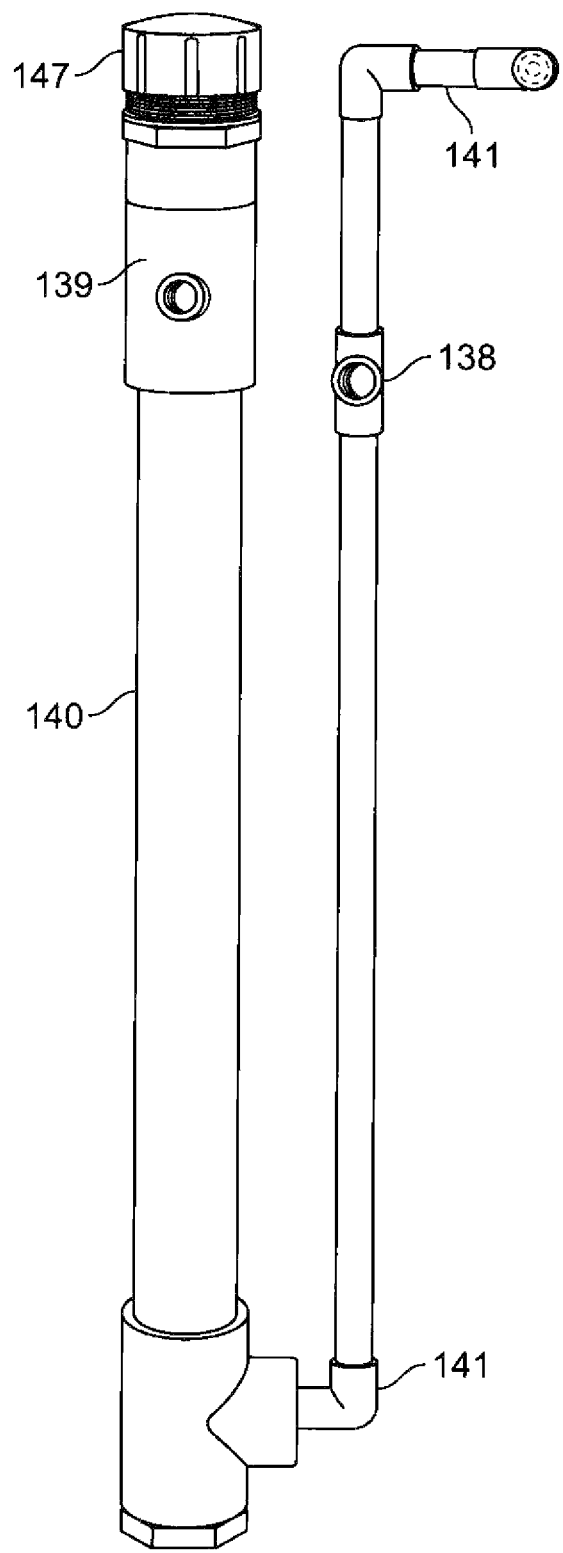
FIG. 4 is a front view of components comprising acid reservoir located in brine tank.

FIG. 4 Provides a view of the acid reservoir assemblies. The acid reservoir 140 is a tall sealed PVC chamber that is filled with acid. When the cleaning solenoid valve 102 (FIG. 1) is activated by the power supply 161, either electronically or manually, tap water is injected into the top of the acid reservoir 140 through fitting 139. Tap water is lighter than acid so it forces acid out the bottom through PVC acid exit pipe 141. The acid is then delivered to the electrolytic cell 120 and the mixer 210 as previously described. The PVC tee fitting 138 is used to secure the acid pipe 141 to the side wall of the brine tank 13, which makes the unit more stable for service and shipping. Threaded cap 147 is removed for refilling the acid reservoir 140. When the cleaning solenoid valve 102 is opened, water enters the top of the acid reservoir 140 through PVC fitting 139. Threaded PVC cap 147 is removed in order to add acid to cleaning reservoir. A threaded air injection cap 109 (see FIG. 1) can be affixed to the Teflon tee so that so that compressed air can be injected to remove old diluted acid.

Figure 5:
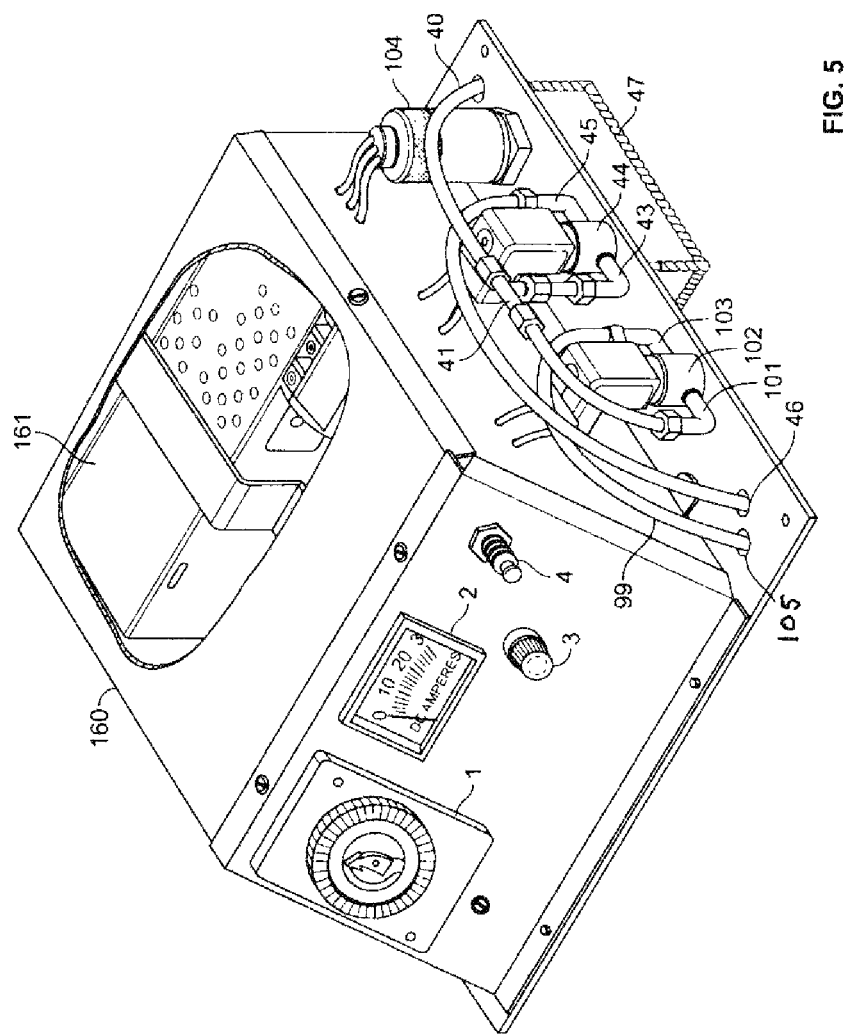
FIG. 5 is a top view of outside of power supply cabinet with cut-away view showing some internal parts.

FIG. 5 Provides a top view of the power supply showing some internal parts

The aluminum power supply cabinet 160 is mounted on top of the brine tank 13 cabinet (see FIG. 1 and FIG. 2) and is comprised of: a 24 hour timer 1, a low voltage ampere meter 2, a fuse holder 3, a manual acid cleaning switch 4 for cleaning the cell, a cleaning solenoid valve 102 and an incoming water solenoid valve 44 for turning water "on" to supply the unit, a water cooled heat exchanger 47, a pressure switch 104 to turn "off" the power supply unit 161 in the event water flow is interrupted.

Figure 6:
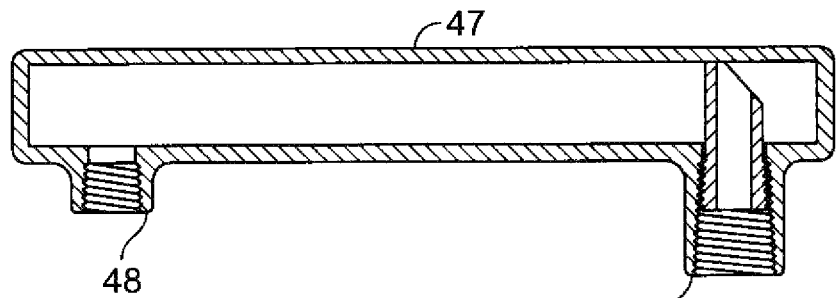
FIG. 6 is a cut-away side view of heat exchanger attached under power supply.

FIG. 6 Provides a view of the heat exchanger. The aluminum heat exchanger 47 is rectangular tubing that is welded shut at each end. Water enters one side of the bottom through water entrance fitting 48 and exits the other side of the bottom through water exit fitting 49. This exit fitting 49 extends to the top of the heat exchanger 47 so that water only exits when exchanger is full of water. In this manner, maximum cooling is accomplished. A thermal grease is applied between the top surface of the heat exchanger 47 and the bottom of the power supply cabinet 160 to aid in the removal of heat generated by power supply circuitry 161 without exposing the electronic circuitry to corrosive air.

Figure 7:
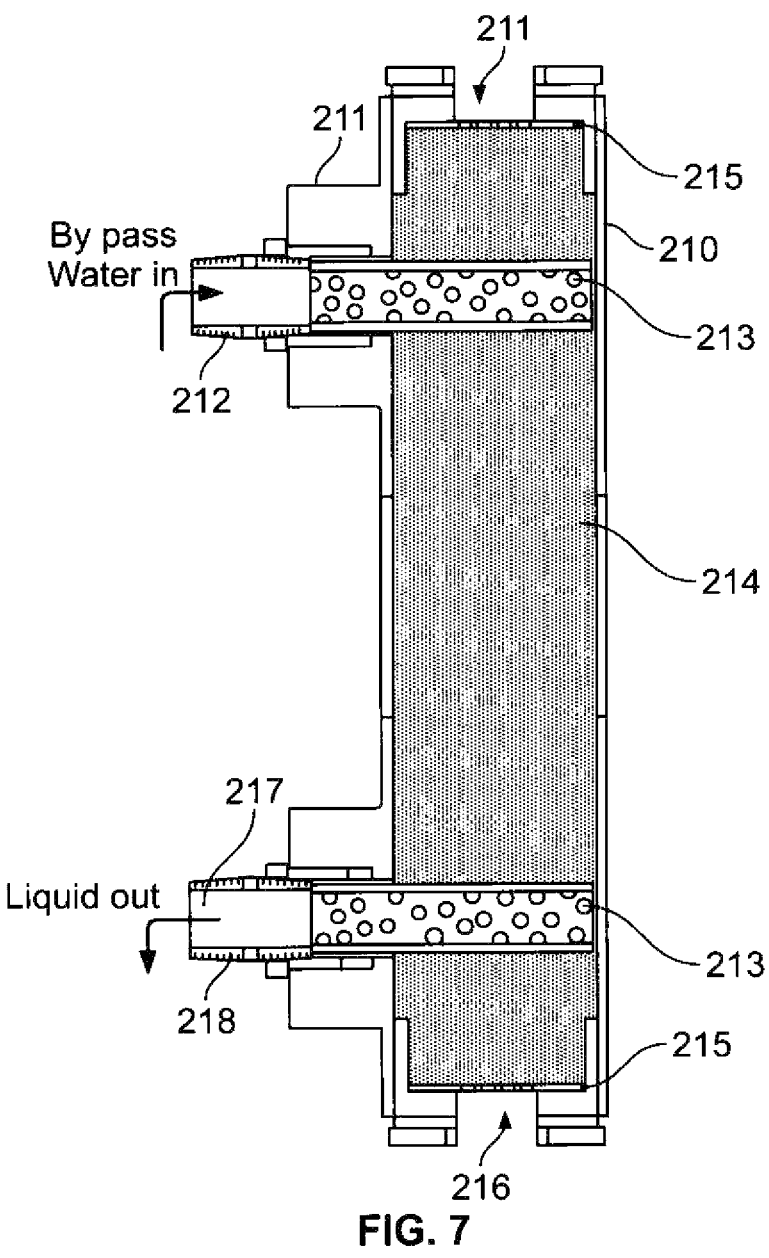
FIG. 7 is a cut-away side view of components of mixer located inside brine tank.

FIG. 7 The mixer. The mixer 210 is a device that allows the gas and liquids sufficient time to mix and become a chlorinated liquid that is delivered to the pool. It is constructed from PVC pipe and fittings. It has a PVC tee with an opening 211 at the top where chlorine gas and acid enter. There are two threaded nipples (212 and 218) that attach the mixer through the wall of the brine tank 13. The nipples are extended to the back wall of the mixer with perforated PVC pipe 213. The inside of the mixer 210 is filled with a medium 214, which also encompass the perforated pipes 213. By-pass water enters the mixer 210 through the upper threaded nipple 212 and chlorinated liquid 217 exits through the lower threaded nipple 218.

Internally, there are two perforated disks 215 that allow liquid to flow through them but retain the medium 214 in their proper place. Overflow water from the brine tank 13 enters the bottom of the mixer at 216. The liquid and manufactured chemicals gravity feed out of the lower threaded nipple 218 through the wall of the brine tank 13 on their way to the pool.

Figure 8:
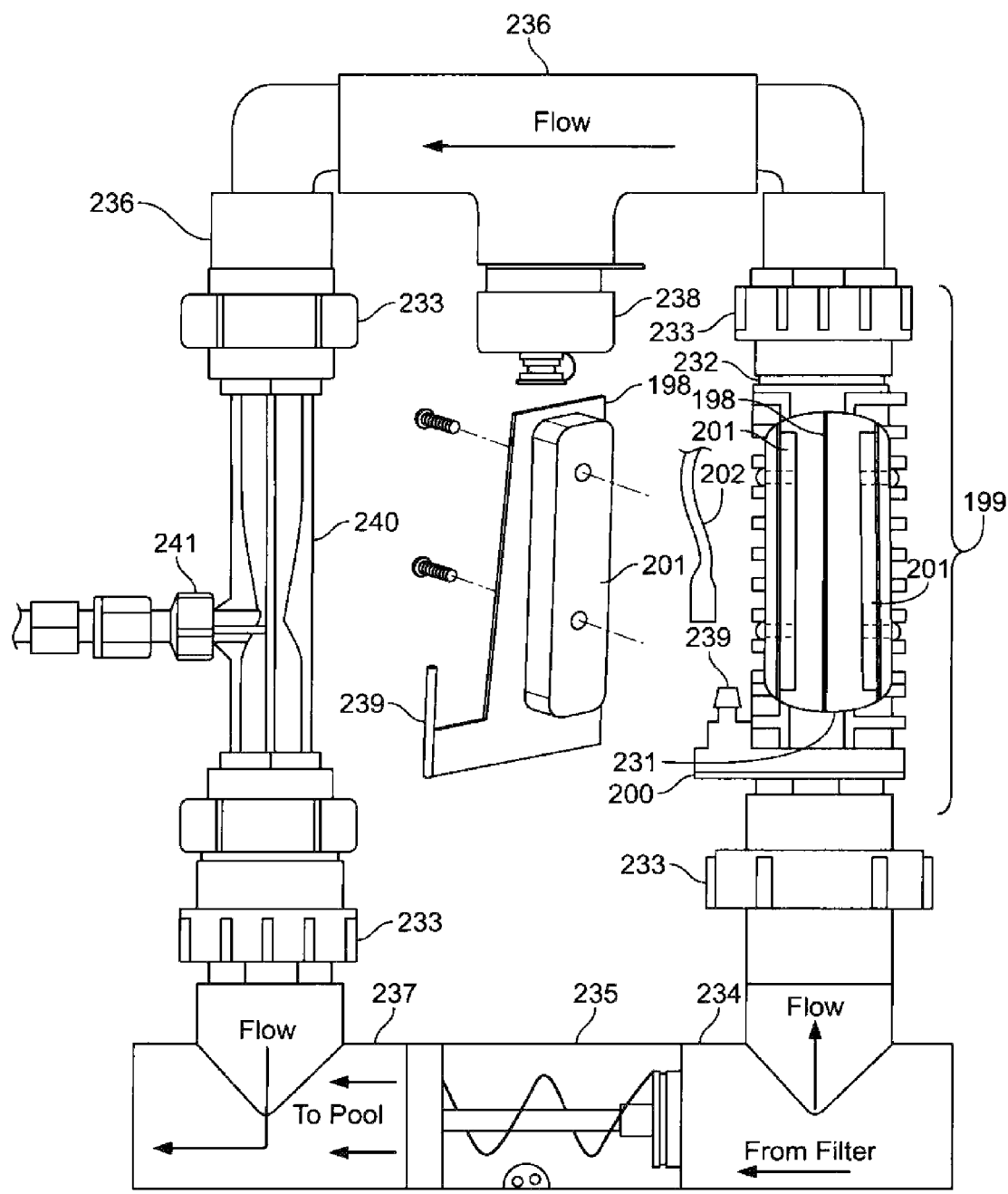
FIG. 8 is a cut-away side view of copper/silver ionizing cell and venturi for installation on commercial pools.

FIG. 8 Provides a view of a manifold loop containing a copper/silver ionizing cell and a venturi. The manifold loop configuration is placed in the return line of the pool after the water has passed through the pool filtering system. The manifold loop contains a flow restrictor 235 that is placed inline between two tees: the upstream tee 234 and the downstream tee 237. The flow restrictor forces part of the filtered pool water up through tee 234. The filtered water then passes through the copper/silver ionizing cell 199, by the flow-sensing switch 238 and then down through a venturi injector 240. As the water goes through the venturi, it creates suction. The suction port 241 is connected to the chlorine exit fitting 19 (see FIG. 1) of the invention. Chemicals created by the invention are drawn into the venturi 240 and are mixed with both the filtered pool water and the copper/silver ions created in the ionizing cell 199. The treated water then returns through tee 237, which is downstream from the flow restrictor 235, and is delivered to the pool through the pool return line. The copper/sliver ionizing cell 199 is comprised of a molded housing 232 that is open at both ends allowing room for water to pass through. At the top end is a coupler 233. At the bottom is a square male fitting 200 that is glued to bottom of cell housing 232 during final assembly. The square male fitting also has a coupler 233 so the completed cell can be removed for service or replacement. Inside the cell housing 232, two sides are grooved so that the titanium electrodes 198 can be held in position. Copper/silver electrodes 201 are attached to the titanium electrodes 198. The electrodes are connected to the power supply 161 (see FIG. 5) by a molded power cord 202. Water laden with copper and silver ions combines with chemicals created by the invention, and is mixed in the manifold 236 and is delivered to the pool through the return line. Adjustable power from the power supply circuit 161 (see FIG. 5) is introduced to the copper/silver electrodes 201. The copper/silver cell 199 is timed separately from the chlorine electrolytic cell. Because of the flow-sensing switch, 238, neither cell will come on if the filter pump is not moving sufficient water through the manifold loop. The molded PVC housing 232 has a compartment 231 for three electrodes. The electrode in the center is a titanium electrode 198 and the copper/silver electrodes 201 are on either side. The copper/silver electrodes are attached to a titanium electrode 198 that is held in position inside the housing 232 by molded grooves and the cell power connector 239 that exits the housing 232. One or more copper/silver ionizing cells 199 can be installed in the manifold loop. PVC couplers 233 are installed so that the cells and venturi can easily be removed for service or replacement. Depending on the demands and the amount of the water being treated, the size and number of copper/silver electrodes and electrolytic cells can be changed to meet various demands. A power cord 202 is connected to the cell power connector 239 which connects the cell to the remote power supply 161 (see FIG. 5). When the copper/silver cell is installed with the invention, the power supply 160 (see FIG. 5) has two 24-hour timers 1 (see FIG. 5) that work independently so that the amount of ions delivered by the copper/sliver cell 199 and the chemicals created by the electrolytic cell 120 (see FIG. 2) can be delivered to the water being treated in different amounts depending on the sanitation demands of the water (this also will be in the second application) I still feel it could all be in one application but I will go with your advice so long as it does not delay the second application for weeks and weeks)

Figure 9:
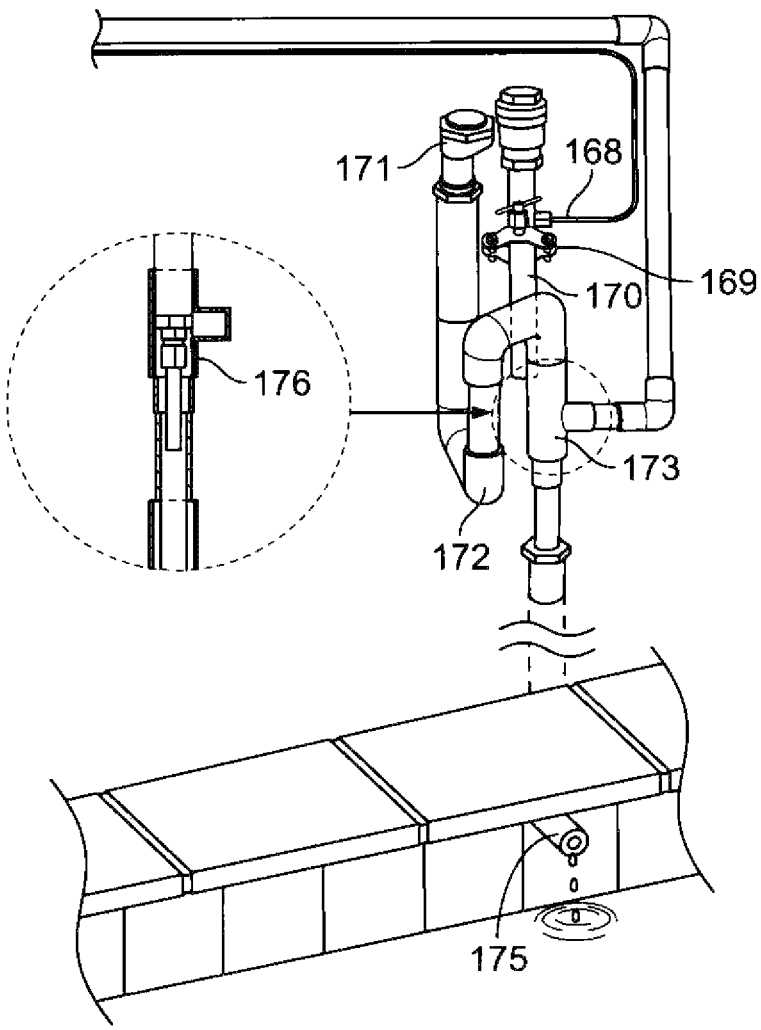
FIG. 9 is a side view of standard pool fill line modified to deliver chlorinated water to body of water to be sanitized.

FIG. 9 Installation of the unit using a pool fill line: provides a view of a typical swimming pool filling system. A saddle valve 169 (or some means to reduce household water to a ¼ inch tubing 168) is installed on the household water line 170. Household water enters an anti-siphon valve 171. When the invention is installed using the pool fill line, a PVC p-trap 172 is installed downstream from the anti-siphon valve 171 to prevent any chlorine fumes from getting to the anti-siphon valve 171. The chlorinated liquid coming from the invention enters the PVC tee "in" fitting 173 and gravity feeds to the pool. An option to the chlorine "in" fitting 173 is a venturi tee injection fitting 176 that is modified so that when water is being added to the pool through the fill line it creates suction from the chlorine line side of the tee. Usually a fill line extension 175 is added to the pool's fill line so that the liquid coming from the invention drips directly into the pool water without drooling down the tile.

Figure 10:
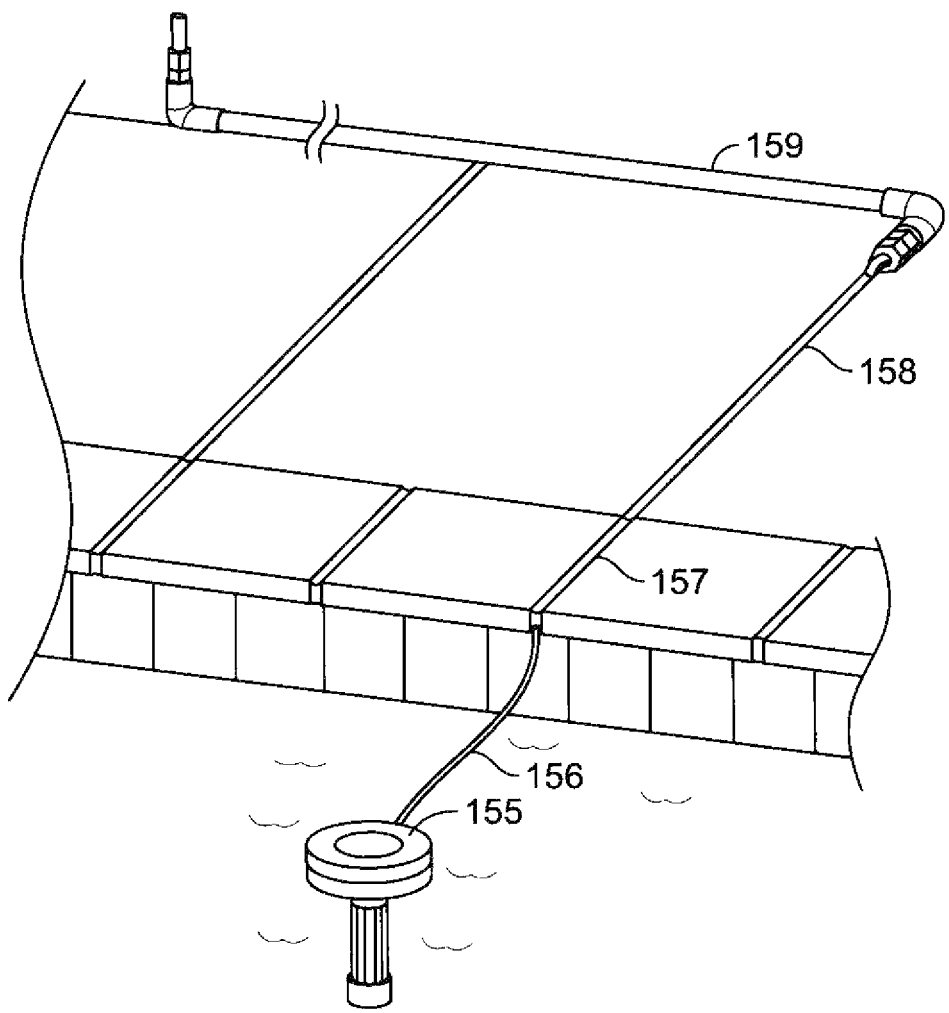
FIG. 10 is a side view of pool deck with tube and pipe to deliver chlorine to pool through float in pool.

FIG. 10 When the fill line is copper or when a pool does not have a fill line, a dispersing float 155 is placed in the pool water and is attached to a Teflon chlorine tube 156. The tube goes through a hole drilled into the coping stone 157. The tube is then installed through the pool decking expansion joint 158, then is routed to the invention using PVC piping 159. In the case where no expansion joint is available, the pool decking can be notched and silicon can be used to hide the Teflon tubing.

Figure 11:
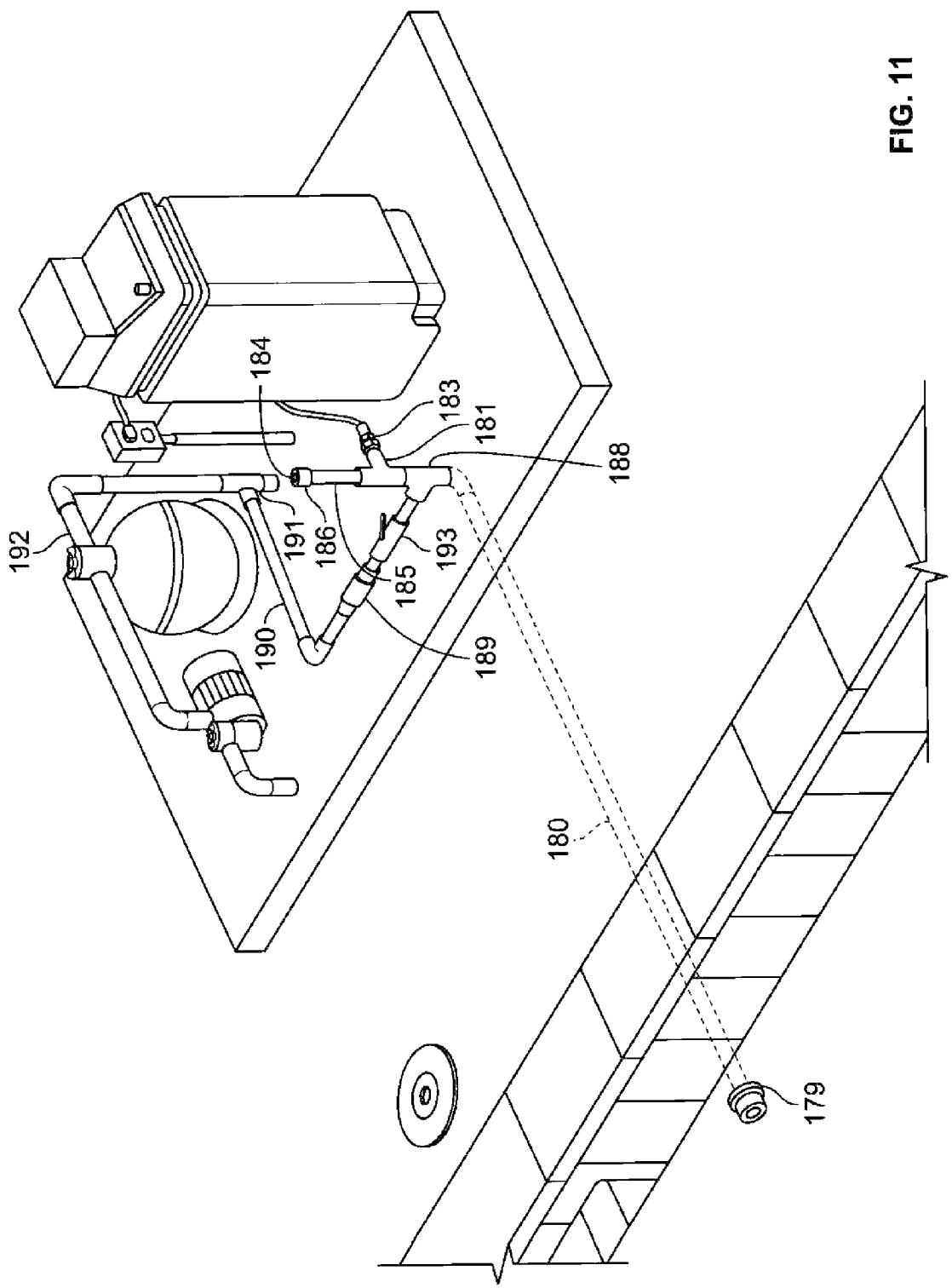
FIG. 11 is a top view of equipment pad with separate line to deliver chlorinated products to pool.

FIG. 11 The installation of the unit using a separate line from the equipment pad During the construction of the pool, a separate chlorine pipe 180 is installed that exits the side of the pool through a wall fitting 179. Usually the line is a 1½ to 2 inch. PVC pipe that runs from the pool to the equipment pad providing that the pad is level with, or higher than, the water in the pool. Where the pipe protrudes out of the equipment pad, two PVC tees are installed. One tee, the chlorine reducing tee 181, is installed leading to a Teflon ¼" fitting 183 for the chlorinated liquid to enter the chlorine pipe 180 at the equipment pad. The other is the filtered water PVC tee 188, which is installed on the chlorine pipe 180 at the equipment pad. A PVC pipe 190 is connected between filtered water tee 191 and tee 188 that provides a small adjustable stream of filtered water. A check valve 189 is installed in pipe 190 to prevent air from entering the pool's filter and pumping system when the filter pump is in the "off" position. A flow control valve 193 is installed in line 190. A separate chlorine line 180 is extended up approximately 18 inches and a PVC cap 186 is installed. The cap has a small vent hole 184 in it.

Figures 12A, 12B:
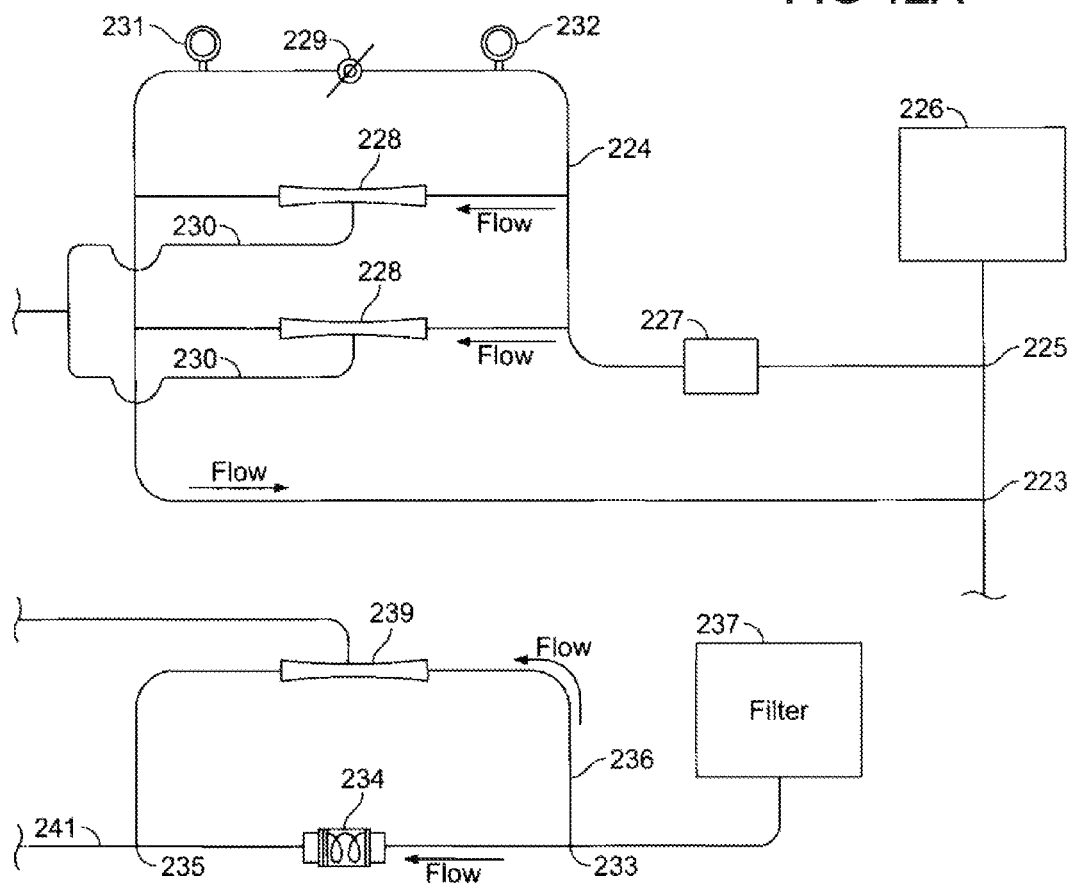
FIG. 12A is a diagram of installation using a booster pump and venturi injectors to deliver chlorinated products to pool.
FIG. 12B is a diagram of installation using a flow control valve and venturi injector to deliver chlorinated products to pool.

FIG. 12A The installation of the unit using a venturi injector. When the unit is installed on a commercial pool (where the equipment is in a room removed from the immediate pool area) and the owner wants the unit installed in the pool equipment room, it becomes necessary to inject the chlorine into the pool's return line as it exits the equipment room. This is done by installing a tee 225 in the pool's return line just after it exits from the pool's filter 226. A portion of the filtered water is directed to a booster pump 227. High-pressure water is directed to a PVC manifold 224 where one or more venturi injectors 228 are installed. A venturi injector flow valve 229 is installed to adjust the flow through the venturi injectors 228. There is a pressure gauge 231 installed on each side of the flow valve 229. When the flow valve 229 is adjusted, the difference in the pressure gauge readings indicates the proper flow through the venturi injectors 228. Suction caused by the high rate of flow going through the venturi injectors 228 and is transferred to venturi suction fittings 230. The chlorinated liquid coming from one or more units is directed to the suction fitting 230. The chlorinated water is then mixed with the filtered water exiting the venturi injectors 228 through the manifold 224 and is directed back into the pool return line through pool fitting 223 before it leaves the pool equipment. The booster pump 227 is wired to operate only when the pool filter pump is operating and the inventions timers are set to operate only during the same time as the booster pump.

FIG. 12B On a smaller pool, a venturi 238 can be installed without a booster pump by installing a filter exit tee 233 after the water leaves the filter 237 and then installing an inline flow valve 234 in the pool return line and another filter water entrance tee 235 on the down-stream side of the flow valve. 234. A bypass manifold 236 is installed with a venturi 238 installed inline. Partially closing the inline flow valve forces filtered water through the venturi 239, which creates suction on line 240, which draws the chlorinated liquid from the invention into the pool return line 241.

What is claimed is:

1. A chlorine-generating and infusion apparatus comprising:
    an inlet port capable of receiving household water;
    a precipitation tank capable of removing minerals from the household water so as to provide softened water; and
    a brine tank capable of containing a solution of salt in the softened water, the brine tank including:
        a chlorine-generating cell submerged in the softened water, the chlorine-generating cell providing at least sodium hypochlorite and sodium hydroxide;
        a power supply for providing power to the chlorine-generating cell,
        a chlorine-generating cell container with a sealed cap at its bottom and at least one hole along its side, the hole preventing un-dissolved salt from entering the chlorine-generating cell container; and
        a cell-cleaning reservoir connected to the chlorine-generating cell,
    wherein the chlorine-generating cell container includes the chlorine-generating cell and:
        separates the un-dissolved salt in the bottom of the brine tank from the brine water, while allowing the brine water to enter an intake of an anode electrode chamber of the chlorine generating cell, the intake being located in the bottom portion of the chlorine-generating cell container, thereby preventing un-dissolved salt from entering the intake of the anode electrode chamber of the chlorine-generating cell;
        allows softened mild salt water at the top of the chlorine-generating cell container to be directed to an intake of a cathode electrode chamber of the chlorine-generating cell; and
        has a series of small holes in its side wall, and is sealed at the bottom so as to form a pocket that discourages chlorinated brine water returning from a dewatering device from migrating throughout the bottom of the brine tank, thereby improving efficiency of production of chlorine gas delivered to the dewatering device, and thereby minimizing the amount of chlorine fumes escaping from the brine tank.

2. The apparatus of claim 1, wherein the chlorine-generating cell also generates hypochlorous acid, oxygen, and sodium hydroxide.

3. The apparatus of claim 1, further comprising:
    apparatus for controlling pH, connected to the brine tank.

4. The apparatus of claim 1, wherein the brine tank is freestanding.

5. The apparatus of claim 1, wherein the power supply and the brine tank are integrated as one unit.

6. The apparatus of claim 1, wherein the brine tank includes:
    an outer shell for storing salt and water; and
    an un-dissolved salt indicator capable of indicating a level of un-dissolved salt.

7. The apparatus of claim 1,
    the cathode electrode chamber containing softened household water,
    the anode electrode chamber containing softened water and being separated from the cathode electrode chamber by an ion selective membrane, and
    the ion selective membrane keeping chlorine and oxygen gases produced in the anode electrode chamber separate from sodium and hydrogen gas produced in the cathode electrode chamber.

8. The apparatus of claim 7, wherein gases in each electrode chamber pump liquid from each electrode chamber in a percolating fashion, thereby urging liquid and gas products produced in each chamber to be delivered to a desired location.

9. The apparatus of claim 7, wherein the chlorine-generating cell includes electrical leads that are connected to electrodes in the anode and cathode chambers, the electrical leads being enclosed in PVC pipes that are injected with a sealing agent that seals the pipes so as to prevent condensation in the pipe, thereby preventing corrosion of electrical connections of the electrical leads.

10. The apparatus of claim 1,
the dewatering device being attached directly to the intake of the anode electrode chamber,
the dewatering device being capable of separating chlorine gas from the brine water after the brine water has been pumped from the anode electrode chamber, and
the dewatering device also being capable of directing the chlorine gas to a mixing chamber, while the unused brine water is returned to the intake of the anode electrode chamber, thereby minimizing the amount of chlorine fumes escaping the brine tank, while also increasing the efficiency of chlorine production by returning discharge from the sealed dewatering device to the intake of the anode side of the chlorine-generating cell.

11. The apparatus of claim 1, configured to store an acidic solution in the cell cleaning reservoir and to deliver the acidic solution to:
the chlorine-generating cell,
a mixing chamber, and
plumbing going to a body of water to be treated.

12. The apparatus of claim 1,
the cell cleaning reservoir having an air injection fitting that can be used to attach a compressed air source that can be used to empty the cell-cleaning reservoir of solution by injecting compressed air.

13. The apparatus of claim 11, wherein the cell-cleaning reservoir comprises: an electrical circuit that can be programmed to periodically activate the release of household water into the cell-cleaning reservoir which in turn forces a portion of the acidic solution from the cell-cleaning reservoir so as to clean:
the chlorine-generating cell,
the mixing chamber,
and the plumbing going to the body of water to be treated.

14. The apparatus of claim 13, further comprising:
power supply with thermal protection that incorporates full voltage regulation, such that when the acidic solution is injected into the chlorine-generating cell, the acid will not cause an electrical overload.

15. The apparatus of claim 13, wherein the power supply can react to information delivered by a controlling unit capable of sensing at least one of the readings of the water being treated, said readings including at least one of pH, chlorine, and copper/silver ions.

16. The apparatus of claim 13, wherein the power supply includes:
an optional circuit having a 24-hour programmable timer; and
a pulsating circuit controlling device adapted to power an ionizing copper/silver cell installed in a circulating system of the body of water being treated.

17. The apparatus of claim 1, further comprising:
a check valve, installed in a chlorine exit line connected to the chlorine-generating cell, the check valve preventing back-up water from back-flowing into the chlorine-generating cell when the same line for delivering make up water is used for adding chlorine from the chlorine-generating cell.

18. A chlorine-generating and infusion apparatus, comprising:
an inlet port capable of receiving household water;
a precipitation tank capable of removing minerals from the household water so as to provide softened water;
a brine tank capable of containing a solution of salt in the softened water, the brine tank including:
a chlorine-generating cell submerged in the softened water, the chlorine-generating cell providing at least sodium hypochlorite and sodium hydroxide,
a power supply for providing power to the chlorine-generating cell,
a chlorine-generating cell container having a sealed cap at its bottom of the pipe and at least one hole along its side, the hole preventing un-dissolved salt from entering the chlorine-generating cell container, and
a cell-cleaning reservoir connected to the chlorine-generating cell; and
a reverse osmosis system, connected to the brine tank, the reverse osmosis system including:
a reverse osmosis housing connected to the brine tank,
a pre-sediment filter connected to the reverse osmosis housing,
a reverse osmosis cartridge disposed within the reverse osmosis housing, and
an inline restrictor connected to the reverse osmosis housing,
wherein household water enters the pre-sediment filter, and then flows into the reverse osmosis housing where the reverse osmosis cartridge serves to separate the water so that a more mineral-free water enters the precipitation tank, and so that the mineral laden water exits the reverse osmosis cartridge through the inline restrictor and into a sealed mixing chamber.

19. The apparatus of claim 18, wherein:
the brine tank includes the sealed mixing chamber, and
a by-pass stream exiting the reverse osmosis system enters the inline restrictor and is then directed to the top of the sealed mixing chamber where the by-pass stream efficiently combines with chlorine gas and forms a chlorinated liquid that is then directed to the water being treated.

20. The apparatus of claim 19, wherein the sealed mixing chamber is mounted inside the brine tank above a highest water level within the brine tank, thereby eliminating leaks.

21. The apparatus of claim 18, the precipitation tank being connected to the inside of the brine tank,
wherein a more mineral-free water that has exited the reverse osmosis cartridge is mixed with a high pH liquid that is pumped from a cathode electrode chamber of the chlorine-generating cell, thereby causing additional minerals in the more mineral-free water to precipitate to the bottom of the precipitation tank, resulting in a much softer water that then flows into the brine tank.

22. The apparatus of claim 21, wherein the precipitation tank includes a pH valve that can be opened so as to allow some high pH water to be directed to waste, thereby lowering the pH of the chlorinated liquid exiting the unit.

23. The apparatus of claim 21, wherein the cathode electrode compartment of the chlorine-generating cell produces a high pH solution, which is pumped from the cathode electrode chamber to the precipitation tank, and is then mixed with the reduced-mineral water exiting the reverse osmosis cartridge, thereby causing dissolved minerals to precipitate to the bottom of the precipitation tank, thereby substantially reducing the amount of dissolved minerals entering the brine tank.

* * * * *